(12) United States Patent
Hyon

(10) Patent No.: US 7,218,920 B2
(45) Date of Patent: May 15, 2007

(54) METHOD FOR STORING AND TRANSMITTING VOICE MAIL USING SVMS IN A MOBILE COMMUNICATION TERMINAL

(75) Inventor: Seung-Taek Hyon, Suwon-shi (KR)

(73) Assignee: Samsung Electronics Co., Ltd. (KR)

( * ) Notice: Subject to any disclaimer, the term of this patent is extended or adjusted under 35 U.S.C. 154(b) by 421 days.

(21) Appl. No.: 10/186,854

(22) Filed: Jul. 1, 2002

(65) Prior Publication Data

US 2003/0003897 A1    Jan. 2, 2003

(30) Foreign Application Priority Data

Jun. 29, 2001    (KR) ............................... 2001-38204

(51) Int. Cl.
*H04M 11/10* (2006.01)
(52) U.S. Cl. ................................. 455/413; 455/412.1
(58) Field of Classification Search ................ 455/466, 455/412.1, 413; 379/88.01, 88.13, 88.16, 379/88.18, 88.22
See application file for complete search history.

(56) References Cited

U.S. PATENT DOCUMENTS

| | | | | |
|---|---|---|---|---|
| 5,630,205 | A * | 5/1997 | Ekelund | 455/412.1 |
| 5,706,211 | A * | 1/1998 | Beletic et al. | 709/206 |
| 6,707,891 | B1 * | 3/2004 | Guedalia | 379/88.17 |
| 6,728,548 | B1 * | 4/2004 | Willhoff | 455/466 |
| 6,775,359 | B1 * | 8/2004 | Ron et al. | 379/88.14 |
| 6,898,623 | B1 * | 5/2005 | Williams et al. | 709/206 |
| 6,901,270 | B1 * | 5/2005 | Beach | 455/563 |
| 6,907,112 | B1 * | 6/2005 | Guedalia et al. | 379/88.17 |
| 7,009,990 | B1 * | 3/2006 | Adams et al. | 370/429 |
| 2002/0059388 | A1 * | 5/2002 | Thompson et al. | 709/206 |
| 2002/0068988 | A1 * | 6/2002 | Chan et al. | 700/94 |
| 2002/0194279 | A1 * | 12/2002 | Chern | 709/206 |

* cited by examiner

*Primary Examiner*—Duc M. Nguyen
*Assistant Examiner*—Aung T Win
(74) *Attorney, Agent, or Firm*—The Farrell Law Firm

(57) ABSTRACT

Disclosed is a method for storing and transmitting a voice mail using SVMS (Simple Voice Mail/Message Service) in a mobile telecommunication terminal. The method comprises compressing a voice message inputted by a user or a received voice mail into a voice data-and storing the compressed voice message or mail; if an SVMS function is selected, reading from a memory a selected voice data, segmenting the read voice data into segmented voice data of a predetermined size, and transmitting the segmented voice data to another mobile communication terminal using the SVMS; reassembling segmented voice files received from a transmitting mobile communication terminal, and storing the reassembled voice file in the memory; and upon receiving a voice mail playback request from the user, reading a selected voice data from the memory, decompressing the read voice data into voice signals, and outputting the voice signals to an output device of the mobile communication terminals.

3 Claims, 3 Drawing Sheets

METHOD FOR STORING AND TRANSMITTING VOICE MAIL USING SVMS IN A MOBILE COMMUNICATION TERMINAL

PRIORITY

This application claims priority to an application entitled "Method for Storing and Transmitting Voice Mail Using SVMS in a Mobile Communication Terminal" filed in the Korean Industrial Property Office on Jun. 29, 2001 and assigned Serial No. 2001-38204, the contents of which are hereby incorporated by reference.

BACKGROUND OF THE INVENTION

1. Field of the Invention

The present invention relates generally to a mobile communication terminal, and in particular, to a method for storing and transmitting voice mails using a simple voice message/mail service (hereinafter, referred to as SVMS) in a mobile communication terminal.

2. Description of the Related Art

These days, the mobile communication terminal has evolved into a multimedia apparatus capable of providing not only a simple telephone call service but also a variety of additional services including electronic diary function, game function, schedule management function, etc. Furthermore, such a mobile communication terminal provides an Internet search function and an e-mail service function via wireless Internet, offering a great convenience to a user.

However, the e-mail service using the mobile communication terminal can transmit only text and voice messages, while an existing PC-to-PC e-mail service can transmit voice messages, image messages and motion pictures as well as text messages.

In general, voice messages need a greater memory capacity than text messages, so a conventional mobile communication terminal requires a high-capacity memory to provide a voice mail service. In addition, it takes a long time to store and reproduce the voice messages, compared with the text messages. Furthermore, a voice data transmitted to the mobile communication terminal as a voice message is stored in a queue or buffer without an extension, and then read for reproduction by calling an associated parameter, and therefore, the voice data is not compatible with a PC (Personal Computer).

SUMMARY OF THE INVENTION

It is, therefore, an object of the present invention to provide a method for transmitting a voice mail in a mobile communication terminal.

It is another object of the present invention to provide a method for compressing a voice message input by a user of a mobile communication terminal or a voice mail received from another mobile communication terminal, and storing the compressed voice message/mail into a voice data having a specific extension.

It is still another object of the present invention to provide a method for compressing a voice message input by a user of a mobile communication terminal or a voice mail received from another mobile communication terminal, storing the compressed voice message/mail into a voice data having a specific extension, and transmitting the voice data using an e-mail service.

To achieve the above and other objects, the present invention provides a method for storing and transmitting a voice message/mail using SVMS in a mobile telecommunication terminal. The method comprises compressing a voice message input by a user or a received voice mail into a voice data and storing the compressed voice message or mail; if an SVMS function is selected, reading from a memory an mail transmission-requested voice data, segmenting the read voice data in a predetermined size, and transmitting the segmented voice messages/files to another mobile communication terminal using the SVMS; reassembling segmented voice messages/files received from said another mobile communication terminal, and storing the reassembled voice data in the memory; and upon receiving a voice mail reproduce request from the user, reading a reproducing-requested voice data from the memory, decompressing the read voice data into voice signals, and outputting the voice signals to an output device of the mobile communication terminal.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described below with reference to the accompanying drawings. In addition, following description and accompanied drawings showing specific details such as processing flow are provided to assist better understanding of the present invention. In the following description, well-known functions or constructions are not described in detail since they would obscure the invention in unnecessary detail.

Figure 1:
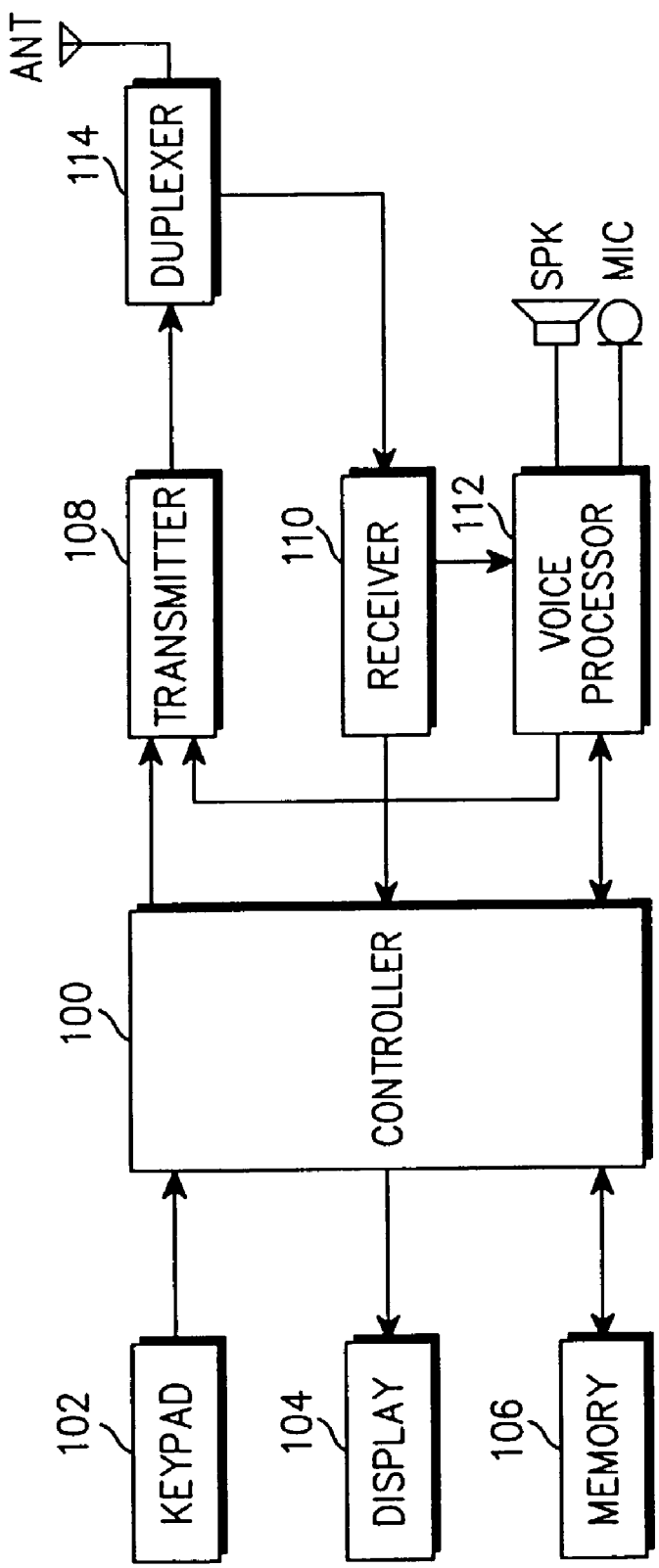
FIG. 1 illustrates a block diagram of a mobile communication terminal to which an embodiment of the present invention is applied.

FIG. 1 illustrates a block diagram of a mobile communication terminal to which an embodiment of the present invention is applied. Referring to FIG. 1, a controller 100 controls an overall operation of a mobile communication terminal. A memory 106 stores a control program for controlling an overall operation of the mobile communication terminal, and also stores in a specific storage area thereof the data inputted and outputted during execution of the control program by the controller 100. Specifically, voice messages/mails received from or to be sent to another mobile communication terminal are compressed into voice data having a specific extension and then stored in the memory 106 according to the present invention. A duplexer 114 performs communication with a base station via an antenna ANT, and separates transmission signals and reception signals. A receiver 110 receives radio signals inputted from the antenna ANT under the control of the controller 100. To be specific, the receiver 110 receives the low-power radio signals separated by the duplexer 114, amplifies the received low-power radio signals and then filters the amplified radio signals. A transmitter 108, under the control of the controller 100, filters and amplifies radio signals outputted from a voice processor 112, and transmits the amplified radio signals through the duplexer 114 and the antenna ANT.

The voice processor 112 modulates voice signals inputted from a microphone MIC into radio signals under the control of the controller 100 in a transmission mode. Further, in a reception mode, the voice processor 112 demodulates the radio signals received from the receiver 110 into baseband voice signals, and then outputs the voice signals to a speaker SPK. In addition, the voice processor 112 records and reproduces a voice message input by the user through a voice message check process or a voice mail received from another mobile communication terminal, and outputs the reproduced voice signals to the speaker SPK.

A keypad 102, having a plurality of numeric keys, generates key data corresponding to a key pressed by the user, and provides the generated key data to the controller 100. Specifically, the keypad 102 includes a Voice Memo Hot Key and a Voice Memo Select Key, or a Voice Memo Icon according to an embodiment of the present invention. A display 104, for example, a liquid crystal display (LCD), displays key data generated from the keypad 102 and a variety of information input from the controller 100, under the control of the controller 100.

Figure 2:
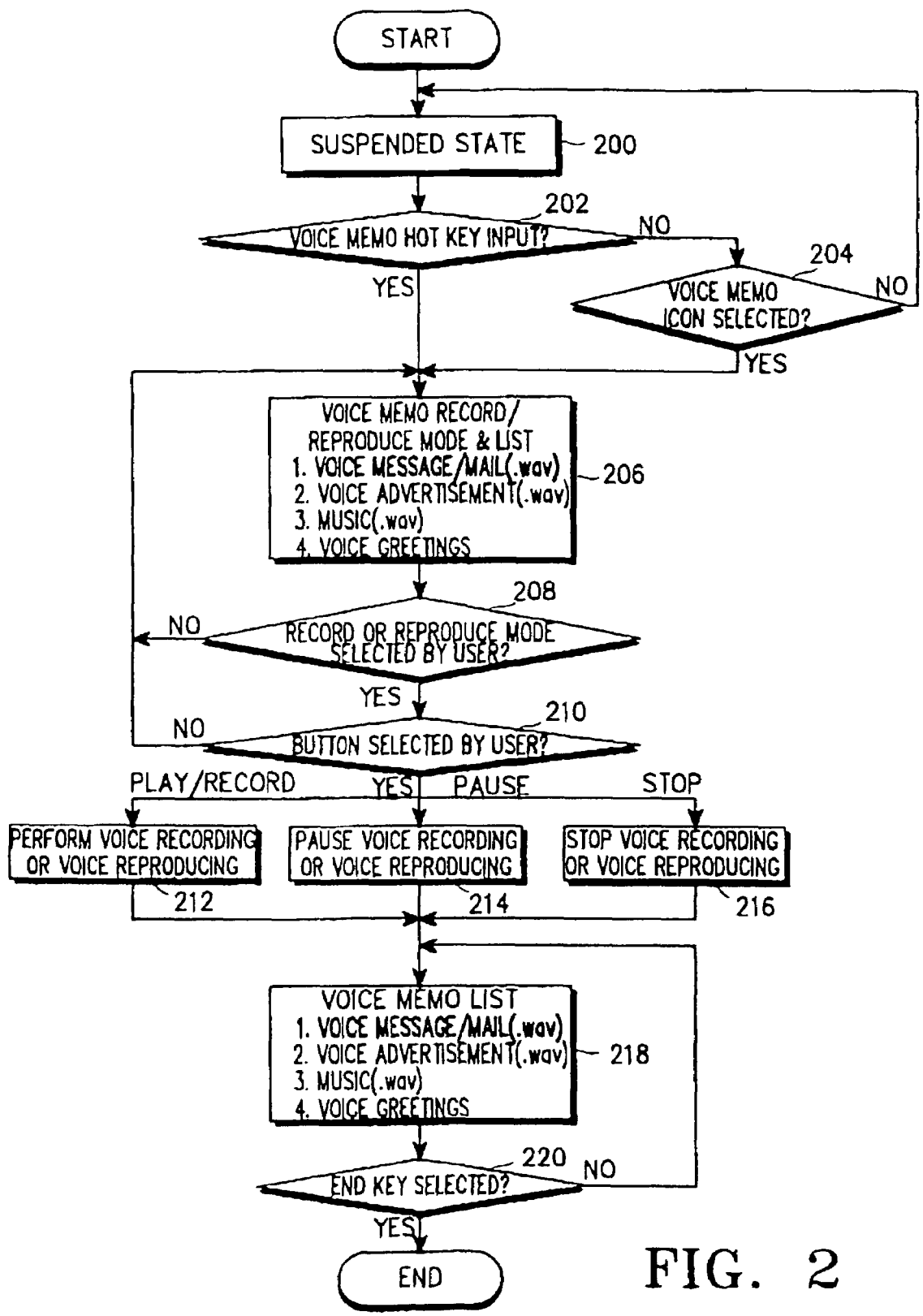
FIG. 2 illustrates a procedure for recording a voice data and reproducing the recorded voice data according to an embodiment of the present invention.
Figure 3:
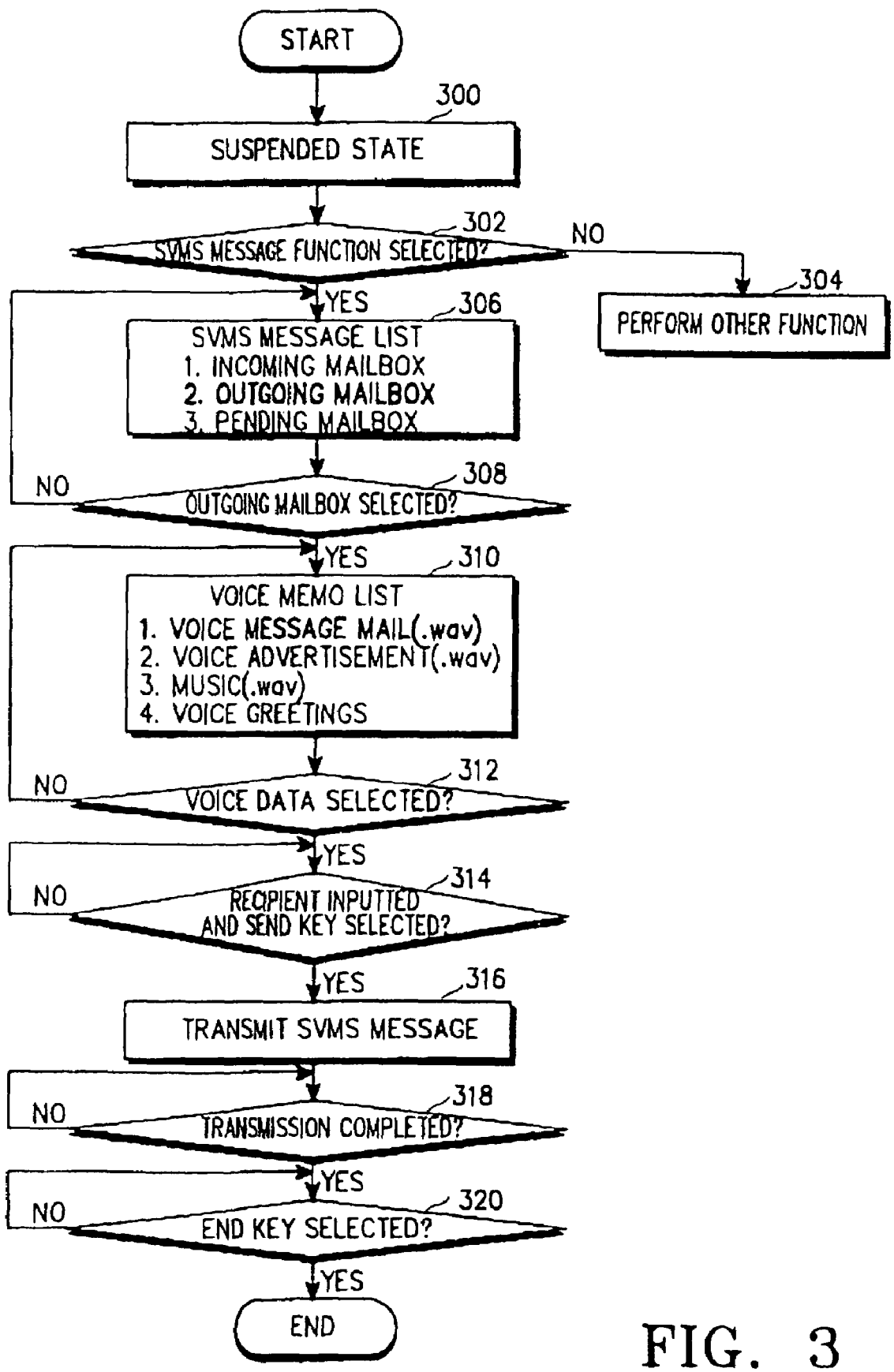
FIG. 3 illustrates a procedure for transmitting a voice mail stored as a voice data according to an embodiment of the present invention.

FIG. 2 illustrates a procedure for recording a voice memo and reproducing the recorded voice memo in a mobile communication terminal according to an embodiment of the present invention, and FIG. 3 illustrates a procedure for transmitting a voice message/mail recorded as a voice memo according to an embodiment of the present invention. The embodiment of the present invention will be described in detail herein below with reference to FIGS. 1 to 3.

Referring to the FIG. 2, a description will be made of how the mobile communication terminal stores a voice message/mail and reproduces the stored voice message/mail. The user first sets Voice Memo Record/Reproduce Mode when he or she desires to transmit a voice message/mail using the mobile communication terminal. In the embodiment of the present invention, the users presses a Voice Memo Hot Key or a Voice Memo Icon provided on the keypad 102 in order to set the Voice Memo Record/Reproduce Mode. In a suspended state of step 200, the controller 100 waits for the Voice Memo Hot Key or the Voice Memo Icon to be pressed/selected by the user. If the Voice Memo Hot Key is pressed by the user in step 202, or if the Voice Memo Icon is selected by the user in step 204, the controller 100 enters the Voice Memo Record/Reproduce Mode, and displays Voice Memo Record/Reproduce List on the display 104, in step 206. For example, the Voice Memo Record/Reproduce List includes "1. Voice Message/Mail (.wav)", "2. Voice Advertisement (.wav)", "3 . Music (.wav)", and "4. Voice Greetings (.wav)".

The Voice Memo Record/Reproduce Mode performed in the steps 206 to 220 is newly implemented in the mobile communication terminal according to an embodiment of the present invention. If the user selects the Voice Memo Record Mode, the controller 100 compresses a voice message input by the user or a received voice mail into a voice file having a specific extension, and stores the voice data in the memory 106. If the user selects the Voice Memo Reproduce Mode, the controller 100 reads a corresponding voice data-from the memory 106 where the compressed voice data are stored, decompresses the read voice data, temporarily stores the decompressed voice data in an internal buffer, and feeds the voice data to the voice processor 112 for voice processing. The voice processor 112 then decodes the voice data into voice signals through voice processing, and outputs the voice signals through the speaker SPK or an earphone of the mobile communication terminal so that the user can hear the voice message. As illustrated in the step 206 of the FIG. 2, the Voice Memo Record/Reproduce List displayed in the Voice Memo Record/Reproduce Mode can include Voice Message/Mail, Voice Advertisement, Music, and/or Voice Greetings.

In the embodiment of the present invention illustrated in the FIG. 2, before transmitting the voice message/mail to another mobile communication terminal using the SVMS the user checks (or reproduces) the contents of a voice message input by the user or a voice mail received from a certain mobile communication terminal. In the FIG. 2, an item selected by the user is highlighted on the display 104 in a bold typeface for the sake of convenience.

More specifically, when the user selects, for example, "1. Voice Message/Mail (.wav)" in step 206 and thereafter selects either the Voice Memo Record Mode or the Voice Memo Reproduce Mode in step 208 in order to record a voice memo or to check the contents of the recorded voice message/mail, the controller 100 enters the selected mode. In addition, when the user selects any one of Play/Record, Pause and Stop buttons in step 210, the controller 100 performs a selected one of operations of steps 212, 214 and 216. That is, if the user selects the Voice Memo Record Mode in step 208 and the Play/Record button in step 210, the controller 110 performs voice recording in step 212. If the user selects the Voice Memo Reproduce Mode in step 208 and the Play/Record button in step 210, the controller 110 performs voice reproducing in step 212. If the user selects the Voice Memo Record Mode in step 208 and the Pause button in step 210, the controller 110 pauses voice recording in step 214. If the user selects the Voice Memo Reproduce Mode in step 208 and the Pause button in step 210, the controller 110 pauses voice reproducing in step 214. If the user selects the Voice Memo Record Mode in step 208 and the Stop button in step 210, the controller 110 stops voice recording in step 216. If the user selects the Voice Memo Reproduce Mode in step 208 and the Stop button in step 210, the controller 110 stops voice reproducing in step 216.

In this manner, the user can record a voice memo to be transmitted as a message/e-mail using the SVMS, and check the contents of the recorded voice file before transmission.

After checking before transmission the contents of the voice mail in the Voice Memo Record/Reproduce Mode of the steps 206 to 216, the user selects a voice data to be transmitted using the SVMS on a Voice Memo List displayed on the display 104 in step 218.

Next, referring to FIG. 3, a description will be made of how the mobile communication terminal transmits as a message/e-mail using the SVMS the voice data recorded and checked in the process of FIG. 2. If the user desires to transmit the voice file created as an SVMS message in the process of FIG. 2, he or she will select an SVMS e-mail function in the suspended mode of step 300. In an alternative embodiment, the SVMS message function can be selected by the user after the step 218 of FIG. 2. The "SVMS message-function" means both (i) a general Short message service (SMS) transmission mode of a mobile communication terminal capable of supporting SMS and (ii) a general e-mail transmission mode of a mobile communication terminal capable of supporting the wireless Internet.

If the user selects the SVMS message function, the controller 100 recognizes the selection of the SVMS message function in step 302, and then proceeds to step 306. The controller 100 displays an SVMS message List on the display 104 in step 306. When the user selects "2. Outgoing Message/Mailbox" from the SVMS message list displayed in step 306 to send a voice mail using the SVMS message function, the controller 100 recognizes the selection in step 308, and then proceeds to step 310. In the step 310, the controller 100 displays the Voice Memo List on the display 104 so that the user can select a voice file to transmit. The remaining options listed on SVMS message list in step 306 will not be described herein.

The user then selects the voice data to transmit from the Voice Memo List in step 310, inputs a recipient (or destination) to receive the voice data, and presses a Send key. When the controller 100 determines in step 312 that the user has selected the voice data, the controller 100 waits for the recipient to be inputted by the user and the Send key to be pressed by the user. If it is determined in step 314 that the user has pressed the Send key, the controller 100 reads a corresponding voice file stored in the memory 106, and transmits the voice data as a mail using the SVMS to the recipient's mobile communication terminal by segmenting the read voice data in a predetermined size depending on transmission capacity.

If it is determined in step 318 that the transmission of the voice data has been completed, the controller 100 determines in step 320 whether the user presses an End key. If the user presses the End key in step 320, the controller 100 ends the SVMS-based voice message/mail transmission operation according to the present invention.

In sum, the mobile communication terminal according to the present invention compresses not only a received voice mail but also the outgoing voice message into a voice data having a specific extension, and transmits the voice data as an SVMS mail after segmenting the voice file into a proper size. In addition, the mobile communication terminal reassembles the received segmented voice data, stores the reassembled voice data in the memory 106, decompresses the voice data into voice signals, and outputs the voice signals to the user through the speaker SPK. By doing so, it is possible to efficiently manage the memory and provide a cost-effective mail service. Further, since the mobile communication terminal compresses the voice message into a voice data with a specific extension, the voice data is compatible with the PC. In addition, by uploading the voice data-to the PC instead of storing them in the mobile communication terminal, it is possible to improve the memory efficiency of the mobile communication terminal.

As elaborated in the foregoing description, the mobile communication terminal according to the present invention compresses a voice mail into a voice file, stores the voice data and transmits the voice file using SVMS mail, contributing to efficient memory management. In addition, since the voice mail is converted into a voice file with a specific extension, the voice file is compatible with the PC. Further, by uploading the voice files to the PC, it is possible to efficiently manage the limited memory capacity of the mobile communication terminal.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for communicating a voice mail using a SVMS (Simple Voice Mail/Message Service) in a mobile telecommunication terminal, the method comprising the steps of:
   creating a voice file having a specific extension and compressing a voice message input by a user and a received voice mail into the voice file having the specific extension in a format compatible with different terminals and storing the compressed voice file, respectively;
   if an SVMS function is selected, reading from a memory of said mobile telecommunication terminal a selected voice file, segmenting the selected voice file into segmented voice data of a predetermined size not exceeding a transmission capacity restricted in an SMS (Short Message Service) or an e-mail, and transmitting the segmented voice data to another mobile communication terminal using the SVMS;
   reassembling the segmented voice data received at said another mobile communication terminal into a new voice file having a specific extension, and storing the new voice file in a memory of said another mobile communication terminal; and
   upon receiving a reproduce request for one of a voice message and a voice mail from the user, reading a selected voice file from the memory of said another mobile communication terminal, decompressing the read voice file into voice data, and outputting voice signals corresponding to the voice data to an output device of the mobile communication terminal.

2. The method of claim 1, wherein the voice data has a specific format compatible with a PC (Personal Computer).

3. The method of claim 1, wherein the voice signal outputting step comprises the steps of:
   storing the decompressed voice data in a buffer; and
   decoding the decompressed voice data into the voice signals.

* * * * *